(12) United States Patent
Taylor

(10) Patent No.: US 10,874,972 B2
(45) Date of Patent: Dec. 29, 2020

(54) AIR FILTER ENGAGEMENT APPARATUS AND RELATED METHODS

(71) Applicant: David M. Taylor, Lubbock, TX (US)

(72) Inventor: David M. Taylor, Lubbock, TX (US)

(*) Notice: Subject to any disclaimer, the term of this patent is extended or adjusted under 35 U.S.C. 154(b) by 275 days.

(21) Appl. No.: 16/059,033

(22) Filed: Aug. 9, 2018

(65) Prior Publication Data

US 2020/0047106 A1    Feb. 13, 2020

(51) Int. Cl.
*B01D 46/42*    (2006.01)
*B01D 46/00*    (2006.01)
*B23P 19/04*    (2006.01)
*F24F 13/28*    (2006.01)

(52) U.S. Cl.
CPC ..... *B01D 46/4227* (2013.01); *B01D 46/0005* (2013.01); *B23P 19/04* (2013.01); *B01D 2279/50* (2013.01); *F24F 13/28* (2013.01)

(58) Field of Classification Search
CPC ........... B01D 46/4227; B01D 46/0005; B01D 2279/50; B01D 46/10; B01D 46/521; B23P 19/04; F24F 13/28
See application file for complete search history.

(56) References Cited

U.S. PATENT DOCUMENTS

| 4,255,175 A | * | 3/1981 | Wilkins | B01D 45/10 210/470 |
| 8,308,209 B1 | * | 11/2012 | Bibow | B25G 3/22 294/61 |
| 2009/0199526 A1 | * | 8/2009 | Wallace | B01D 46/10 55/493 |
| 2010/0207407 A1 | * | 8/2010 | Walker, Jr. | B01D 46/4227 294/210 |
| 2015/0096271 A1 | * | 4/2015 | Cole | B01D 46/4227 55/385.2 |

* cited by examiner

*Primary Examiner* — Robert Clemente
(74) *Attorney, Agent, or Firm* — Cameron P. Smith

(57) ABSTRACT

This application describes a unique air filter engagement apparatus and related methods. The invention allows a user to easily replace an air filter using a unique engagement apparatus in addition to an apparatus on the filter itself. This apparatus along with the specific methods of use allow a user to replace air filters quickly and efficiently in often inaccessible or hard to reach areas.

19 Claims, 3 Drawing Sheets

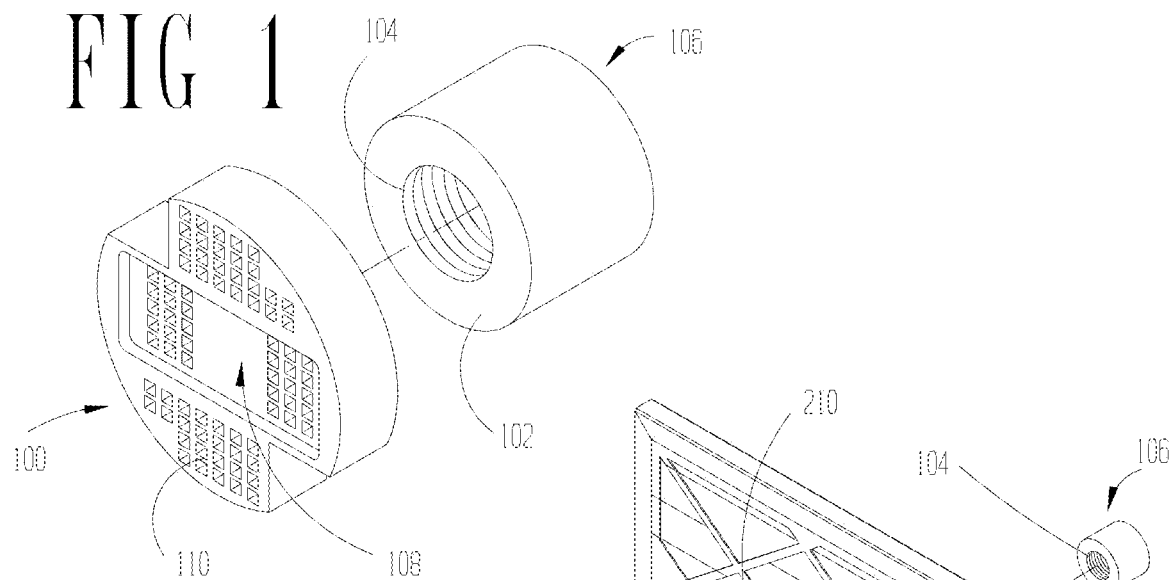
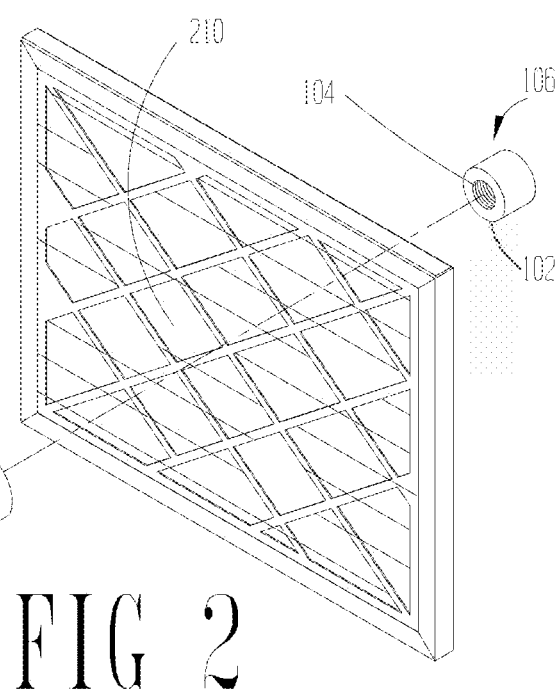
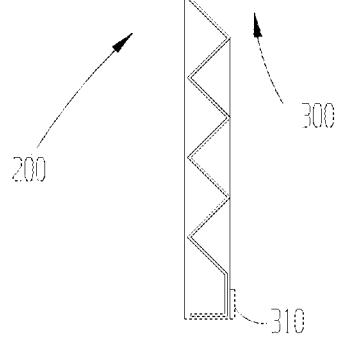
FIG 1
FIG 2
FIG 3

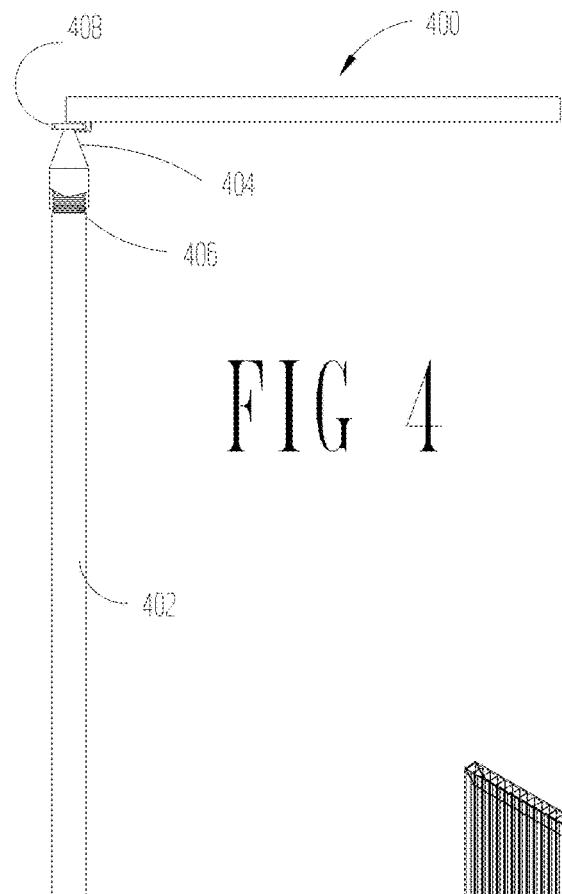
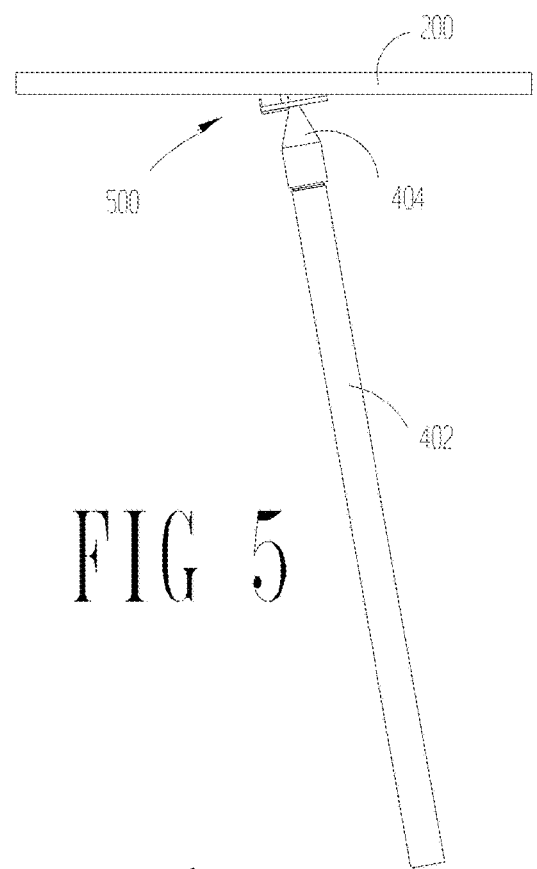
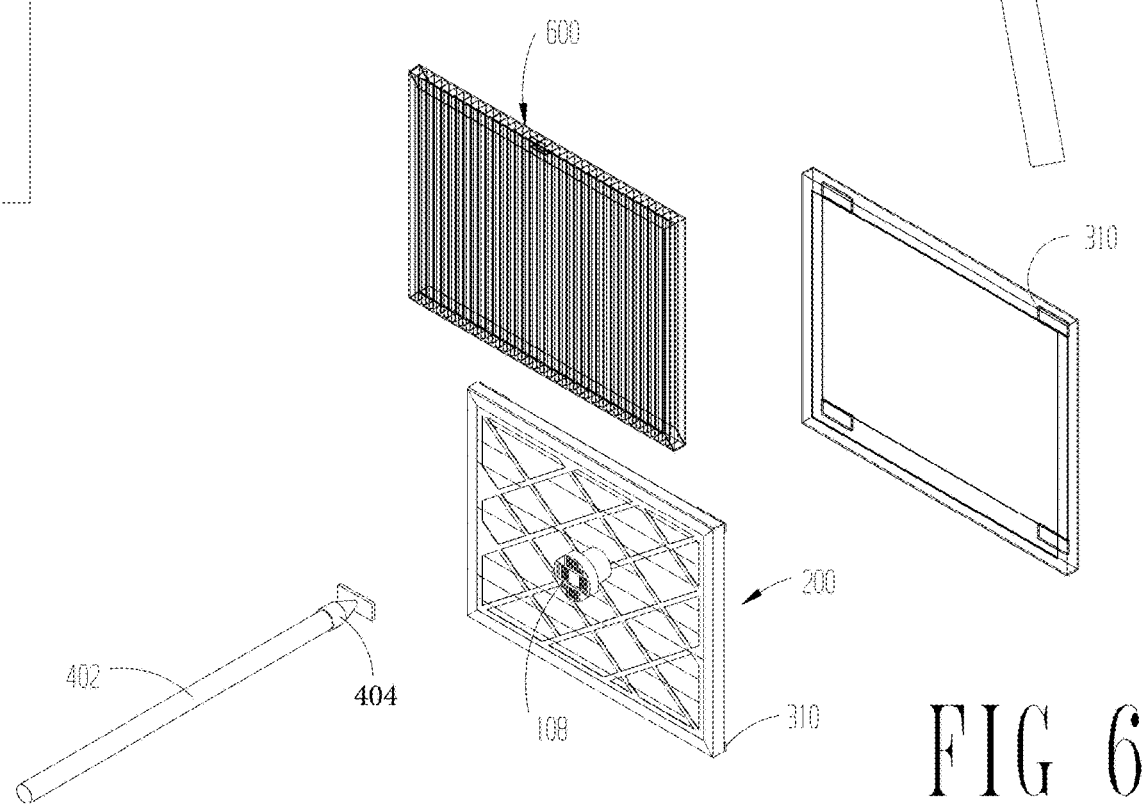

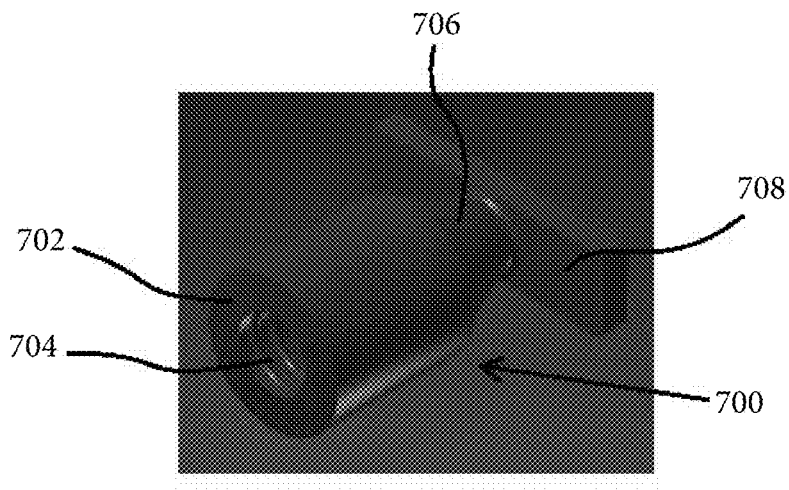
FIG 7
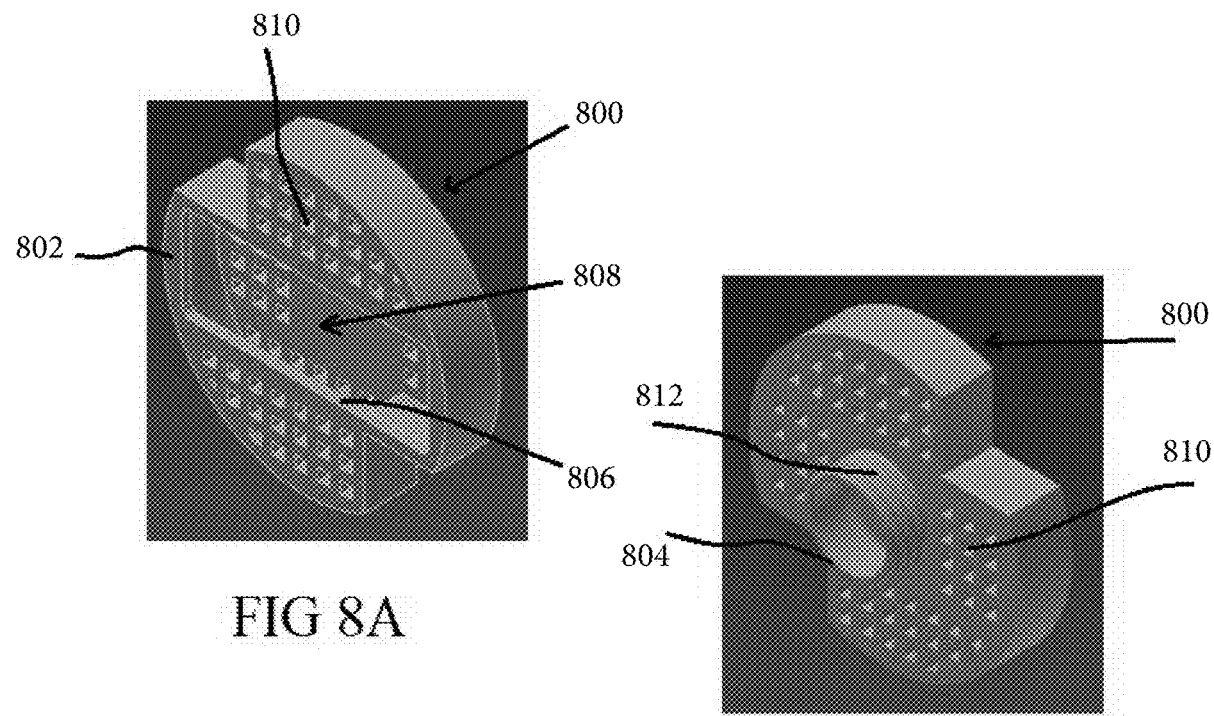
FIG 8A
FIG 8B

AIR FILTER ENGAGEMENT APPARATUS AND RELATED METHODS

CROSS-REFERENCE TO RELATED APPLICATIONS

None.

STATEMENT OF FEDERALLY SPONSORED RESEARCH OR DEVELOPMENT

None.

REFERENCE TO A SEQUENCE LISTING, A TABLE, OR A COMPUTER LISTING COMPACT DISC APPENDIX

None.

BACKGROUND OF THE INVENTION

This invention relates to a device and method of replacing an air filter.

Household and commercial filters require regular replacement or cleaning to maintain functional systems. For example, the water filter in a refrigerator requires regular replacement to continue its functionality of providing you with clean, safe drinking water and ice. In the same way, household air filters require regular replacement or cleaning to continue to be effective at filtering the air in a house, dwelling, or commercial property. If left un-cleaned or un-replaced, the filters will clog with dirt and build-up, essentially rendering them useless and putting strain in the HVAC system.

Household intake air filters, in particular, are usually located in ceiling. They can often be hard to reach and even harder to remove or replace. Simply removing an intake air filter usually requires an array of tools that the normal household may not possess as there is no universal or easy way to access the dirty intake air filter and then clean it or replace it with a new one.

The use of systems to replace an air conditioning filter is known in the prior art. More specifically, systems to replace an air conditioning filter previously devised and utilized for the purpose of helping an air conditioning technician to replace an air conditioning filter are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe an air filter replacement system that allows allowing a user to easily replace an air conditioning filter.

In this respect, the air filter replacement system, specifically the apparatus and methods, according to the present invention substantially departs from the conventional concepts and designs of the prior art, and in doing so provides an apparatus primarily developed for the purpose of allowing a user to easily replace an air conditioning filter.

Therefore, it can be appreciated that there exists a continuing need for a new and improved an air filter replacement system which can be used for allowing a user to easily replace an air filter. In this regard, the present invention substantially fulfills this need.

SUMMARY OF THE INVENTION

In one embodiment, the claimed invention is an air filter engagement apparatus comprising a pole or handheld device with a handle portion at the proximal end and a male acme thread portion at the distal end, a pole attachment that is attached to the distal end of the pole by an acme thread, and a filter attachment comprised of a male component and female component connected by a threaded or interlocking mechanism. In one embodiment, the proximal end of the pole attachment is a female acme thread that screws to the distal end male acme thread of the pole. In one embodiment, the distal end of the pole attachment is a rectangular shape capable of interlocking with the male component of the filter attachment. In other embodiments, the distal end of the pole attachment may be other shapes, such to correspond and interlock with the shape of the male component of the filter attachment.

In one embodiment, the male component of the filter attachment is comprised of a cylindrical hollow disc is porous with a plurality of porous holes to allow air flow through the filter attachment on the proximal end and a male threaded screw on the distal end. In addition, the hollow disc has a rectangular cutout providing access to the interior of the male component.

In a preferred embodiment, the pole attachment is inserted into the male component through the rectangular opening and rotated within the cylindrical hollow disc to provide a temporary attachment and engagement of the pole attachment to the male component of the filter attachment. The pole attachment is unattached and unengaged by rotating in the opposite direction and removing the rectangular portion of the pole attachment through the rectangular opening in the male component of the filter attachment.

In one embodiment, the female component of the filter attachment comprises a threaded cylinder on the proximal end by which the male component of the filter attachment can be screwed into the female component of the filter attachment, and a rectangular plate on the distal end. The female component of the filter attachment can then be attached to an air filter by manipulating the distal end plate within the grooves and through an air filter.

In one embodiment, the female component of the filter attachment is attached to the center of the air filter. Then, the distal end of the female component of the filter attachment is attached to the air filter and the distal end of the male component of the filter attachment is screwed into the proximal end of the female component of the filter attachment whereby the pole attachment is then inserted and rotated to attach and engage to the proximal end of the male component of the filter attachment whereby the air filter can then be moved or manipulated by the pole attachment and attached pole or handheld device.

In one embodiment, the claimed invention is a method of replacing an air filter within an air filter housing using an air filter grasping apparatus comprising: a pole or handheld device with a handle portion at proximal end and a male acme thread portion at the distal end; a pole attachment that is attached to the distal end of the pole by an acme thread wherein the proximal end of the pole attachment is a female acme thread that screws to the distal end male acme thread of the pole; a filter attachment comprised of a male and female component connected by a threaded screwing mechanism.

In one embodiment, the device comprises an air filter comprising of standard one-way airflow material fixed across a frame wherein a female component of a filter attachment comprising of an exposed female threaded cylinder is affixed within said airflow material. In one embodiment, the female threaded cylinder is exposed to the filter's proximal end and is capable of receiving a male threaded component. In a preferred embodiment, the male threaded component is part of an air filter engagement apparatus.

In one embodiment, the pole attachment is used to open the clasps or closing mechanism of the air filter housing and open the air filter housing. In one embodiment, then the grasping apparatus is used to remove an air filter from the open the air filter housing and then the grasping apparatus is used to insert an air filter into the air filter housing. The inserted air filter may be a cleaned air filter or a new air filter.

In one embodiment, the distal end of the pole attachment is used to close the air filter housing and close the clasps or closing mechanism of the air filter housing. The closing mechanism and clasps may include any standard air filter clasp or modified cabinetry clasp. In one embodiment, the air filter has magnets attached that assist in inserting the air filter into the air filter housing. In particular, the magnets would hold the new air filter in place if the air filter housing contained metal components. If the air filter housing does not contain metal components, metal components could be added such to correspond and attach to magnets on the air filter. In an alternative embodiment, magnets may be attached to the air filter housing to correspond and attach to metal components on the air filter.

BRIEF DESCRIPTION OF THE DRAWINGS

These and other features, aspects, and advantages of the present invention will become better understood with regard to the following descriptions, appended claims, and accompanying drawings where:

FIG. 1 shows a proximal view of the male and female components of the filter attachment.

FIG. 2 illustrates a proximal view of the male and female components of the filter attachment attaching to an air filter.

FIG. 3 illustrates the fully attached view of the filter attachment to an air filter.

FIG. 4 illustrates a pole attachment device being used to open an air filter housing.

FIG. 5 illustrates a pole attachment device engaging a filter attachment and air filter.

FIG. 6 depicts the proximal views of an air filter material, an air filter frame, the combined air filter material with the frame and filter attachment, and pole attachment device.

FIG. 7 shows a proximal view of the pole attachment component.

FIG. 8A shows a proximal view of the male component of the filter attachment.

FIG. 8B shows a distal view of the male component of the filter attachment.

DETAILED DESCRIPTION OF THE INVENTION

In the Summary of the Invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference if made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

As shown in FIG. 7, one embodiment of the claimed apparatus and methods comprises a pole attachment device 700 with a proximal end 702 and a distal end 706. In a preferred embodiment, the proximal end 702 contains a cylinder with female acme threading 704. The female acme threading 704 may then attach to a variety of male acme threading devices including stationary poles, extendable poles, or other devices to facilitate the movement and manipulation of the attached pole attachment device 700. FIGS. 4 and 5 depict an embodiment in which a pole 402 is threaded into 406 the pole attachment device 404. FIG. 4 specifically depicts the apparatus being used to unclasp the locking mechanism 408 of an air filter housing 400. Once unclasped, the door of the air filter housing 400 would swing down to expose the air filter 200 as depicted in FIG. 5. In certain embodiments, the filter housing may be part of the apparatus and manufactured and sold along with the air filter apparatus and methods claimed herein.

FIG. 5 shows an embodiment in which the pole 402 and pole attachment device 404 are used to engage the male component of the filter attachment. In another embodiment, the distal end 408 of the pole attachment device 404 is attached to a pole or handheld device and can be used to close the clasps, closing, or locking mechanism of the air filter housing once an air filter has been inserted.

In one embodiment depicted in FIG. 7, the proximal end 702 of the pole attachment device 700 and the distal end 706 of the pole attachment device 700 are one solid piece. In another embodiment, the proximal end 702 of the pole attachment device 700 and the distal end 706 of the pole attachment device are connected by a ball joint or other attachment to allow angled adjustment of proximal end 702 to the distal end 706.

As shown in FIG. 7, one embodiment of the claimed apparatus and methods comprise a solid rectangular structure 708 on the distal end 706 of the pole attachment device 700. As shown in FIG. 7 and FIG. 8A, the preferred embodiment on the distal end 706 of the pole attachment device 700 is a solid rectangular structure 708 to fit within the rectangular opening 806 of the proximal end 802 of the male component of the filter attachment 800.

The proximal end 802 of the male component of the filter attachment 800 is depicted in FIG. 8A. The distal end 804 of the male component of the filter attachment 800 is depicted in FIG. 8B.

As shown in FIG. 8A, a preferred embodiment of the male component of the filter attachment 800 will have a hollow cylindrical cavity 808. When the solid rectangular structure 708 is inserted into the rectangular opening 806 through the proximal end 802 of the male component of the filter attachment 800, it then enters the hollow cylindrical cavity 808. As shown in FIG. 8A, once inserted into the rectangular opening 806, the hollow cylindrical cavity 808 allows the rotation of the rectangular structure 708 in a counter-clockwise direction to lock the pole attachment device 700 to the proximal end 802 of the male component of the filter attachment 800. This in turn allows movement and manipulation of the male end of the filter attachment 800 by the pole attachment device 700 and thus by any attached acme threading device.

As shown in FIG. 8A and FIG. 8B, a preferred embodiment of the male component of the filter attachment 800 comprises a plurality of small openings 810 to allow air flow through the male component of the filter attachment 800. In a preferred embodiment, said openings 810 would not hinder air flow by any attached air filter. As shown in FIG. 8A and FIG. 8B, in one embodiment, the plurality of small openings 810 would be on both the proximal and distal sides of the hollow cylindrical cavity 808.

As shown in FIG. 5, the proximal end of the pole attachment device 404 is screwed onto a pole or other handheld device 402. The distal end of the pole attachment device 404 can then be inserted and locked into the hollow cylindrical cavity 500 of the male component of the filter attachment device. The air filter 200 can then be moved or manipulated by the attached pole or handheld device.

In one embodiment, the pole or handheld device can be engaged to an air filter that is in the air filter housing to remove the air filter from the housing. In another embodiment, the pole or handheld device can be engaged to an air filter that is on the ground or otherwise outside of the air filter housing and be used to insert the air filter into the air filter housing.

FIG. 1 depicts an embodiment in which the male component of the filter attachment device 100 is threaded into the female component of the filter attachment 106. As described above, the male component of the filter attachment 100, in a preferred embodiment would comprise a rectangular opening 108 in which to insert the pole attachment device as well as a plurality of small openings 110 to allow air flow through the male component of the filter attachment. In the embodiment of FIG. 1, the male component of the filter attachment 100 is threaded into 104 the female component of the filter attachment 106 through the proximal end 102 of the female component of the filter attachment 106.

FIG. 2 depicts an embodiment in which the male component of the filter attachment 100 is threaded into 104 the proximal end 102 of the female component of the filter attachment 106. In this particular embodiment, the male and female components may be affixed by screwing through a normal, unaltered air filter. In one embodiment, the male and female components would affix to each other by screwing through the middle 210 of an unaltered air filter.

As shown in FIG. 2, in one embodiment, the female component of the filter attachment 106 is attached to the middle of an air filter 210 with the proximal end 102 facing downward. In one embodiment, the air filter is an intake filter for a home air conditioning system. In this particular embodiment, the proximal end 102 will face into the dwelling where the air is being pulled from. The distal end of the male component of the filer attachment 100 will screw into the female threading 104 of the proximal end 102 of the female component of the filter attachment 106 which may be attached to said air filter.

As depicted in FIG. 3, another embodiment consists of a pre-manufactured air filter 200 with the female component of the filter attachment 300 manufactured within the air filter. In this embodiment, the male component of the filter attachment 100 would screw into 312 the female component of the filter attachment 300 which may be manufactured and sold with the filter. In this case, the thread of the air filter attachment would be universal such that the male component of the filter attachment 100 would be capable of affixing to any manufactured filter including a female component 300.

As further shown in FIG. 3, in one embodiment, the manufactured air filter may contain magnets 310 on the edges such to assist with removing and replacing the air filter. The magnets 310 may temporarily attach the filter to the air filter housing if the air filter housing is comprised of metal. If the air filter housing is not comprised of metal, metal inserts may be added to the housing to allow the magnets 312 to temporarily attach to the housing. By allowing the air filter to temporarily attach within the air filter housing, assistance is given in inserting an air filter into an air filter housing or removing an air filter from an air filter housing. One example where this may be useful would be in an overhead air filter in which the air filter would fall out if unsecured.

FIG. 6 depicts all components involved in one embodiment, including an air filter 600, an air filter frame, and the combined air filter in the frame 200. In this particular embodiment, the air filter 600 is within a cardboard frame comprised of magnets 310 on all four corners. The interior air filter and cardboard frame are depicted separately and then combined 200. As shown in FIG. 6, the male component of the filter attachment has been affixed to the female component of the filter attachment, leaving the rectangular opening 108 of the male component exposed on the proximal end of the filter. The entire filter apparatus 200 may then be removed from a filter housing by using a pole 402 to insert the pole attachment device 404 into the rectangular opening 108 of the male component of the filter attachment. The pole 404 may then be used to rotate the pole attachment device 404 counter-clockwise within the hollow cavity of the male component of the filter attachment, thereby temporarily securing the pole attachment device to the filter attachment. The filter may be then pulled out of a filter housing using the pole 402. Once out of the filter housing, the filter and filter attachment may then be removed from the pole attachment device 404 by rotating clockwise and removing the pole attachment device through the rectangular opening 108 of the male component of the filter attachment. The male component of the filter attachment may then be removed from the filter and reused or repurposed.

What is claimed is:

1. An air filter engagement apparatus comprising:
   a pole or handheld device with a handle portion at the proximal end and a male acme thread portion at the distal end,
   a pole attachment that is attached to the distal end of the pole by an acme thread,
   a filter attachment comprised of a male component and female component connected by a threaded screwing mechanism.

2. The apparatus of claim 1 wherein the proximal end of the pole attachment is a female acme thread that screws to the distal end male acme thread of the pole.

3. The apparatus of claim 1 wherein the distal end of the pole attachment is a rectangular shape capable of interlocking with the male component of the filter attachment.

4. The apparatus of claim 1 wherein the male component of the filter attachment is comprised of a cylindrical hollow disc is porous with a plurality holes to allow air flow through the filter attachment on the proximal end and a male threaded screw on the distal end.

5. The male component of claim 4 wherein the hollow disc has a rectangular cutout providing access to the interior of the male component.

6. The male component of claim 1 whereby said pole attachment is inserted into the male component through the rectangular opening and rotated within the cylindrical hollow disc to provide a temporary attachment and engagement of the pole attachment to the male component of the filter attachment.

7. The apparatus of claim 1 wherein the female component of the filter attachment comprises a threaded cylinder on the proximal end by which the male component of the filter attachment can be screwed into the female component of the filter attachment.

8. The apparatus of claim 7 wherein the female component of the filter attachment is attached within and through an air filter, with the internal threading exposed.

9. The apparatus of claim 8 wherein the female component is attached to the center of the air filter.

10. The apparatus of claim 1 whereby the distal end of the female component of the filter attachment is attached to the air filter and the distal end of the male component of the filter attachment is screwed into the proximal end of the female component of the filter attachment whereby the pole attachment is then inserted and rotated to attach and engage to the proximal end of the male component of the filter attachment whereby the air filter can then be moved or manipulated by the pole attachment and attached pole or handheld device.

11. An air filter comprising of an airflow material fixed across a frame wherein a female component of a filter attachment comprising of an exposed female threaded cylinder is affixed within said airflow material.

12. The air filter of claim 11 wherein the female threaded cylinder is exposed through the filter's proximal end and is capable of receiving a male threaded component.

13. The air filter of claim 12 wherein the male threaded component is part of an air filter engagement apparatus.

14. A method of replacing an air filter within an air filter housing using an air filter engagement apparatus comprising:
   utilizing a pole or handheld device with a handle portion at proximal end and a male acme thread portion at the distal end,
   utilizing a pole attachment that is attached to the distal end of the pole by an acme thread wherein the proximal end of the pole attachment is a female acme thread that screws to the distal end male acme thread of the pole,
   engaging a filter attachment comprised of a male and female component connected by a threaded screwing mechanism
      wherein the distal end of the pole attachment is a rectangular shape capable of interlocking with the male component of the filter attachment,
      wherein the male component of the filter attachment is comprised of a cylindrical hollow disc is porous with a plurality of holes to allow air flow through the component on the proximal end and a male threaded screw on the distal end wherein the hollow disc has a rectangular cutout providing access to the interior of the male component whereby said pole attachment is inserted into the male component through the rectangular opening and rotated within the cylindrical hollow disc to provide a temporary attachment and engagement of the pole attachment to the male component of the filter attachment,
      wherein the female component of the filter attachment comprises a threaded cylinder on the proximal end by which the male component of the filter attachment can be screwed into the female component of the filter attachment, and a rectangular plate on the distal end wherein the female component of the filter attachment is attached to an air filter and the female component is attached to the center of the air filter,
      whereby the distal end of the female component of the filter attachment is attached to the air filter and the distal end of the male component of the filter attachment is screwed into the proximal end of the female component of the filter attachment whereby the pole attachment is then inserted and rotated to attach and engage to the proximal end of the male component of the filter attachment whereby the air filter can then be moved or manipulated by the pole attachment and attached pole or handheld device.

15. The method of claim 14 whereby the distal end of the pole attachment is used to open the clasps or closing mechanism of the air filter housing and open the air filter housing.

16. The method of claim 15 whereby the grasping apparatus is used to remove an air filter from the open the air filter housing.

17. The method of claim 16 whereby the grasping apparatus is used to insert an air filter into the air filter housing.

18. The method of claim 17 whereby the distal end of the pole attachment is used to close the air filter housing and close the clasps of the air filter housing.

19. The method of claim 14 whereby the air filter has metal or magnets attached to the air filter to assist in insertion into the air filter housing.

* * * * *